United States Patent [19]

Hargrove

[11] Patent Number: 5,003,157
[45] Date of Patent: Mar. 26, 1991

[54] SNOW MELTING PATHWAY MAT APPARATUS

[76] Inventor: Dennis Hargrove, P.O. Box 7111, Jacksonville, N.C. 28540

[21] Appl. No.: 470,373

[22] Filed: Jan. 25, 1990

[51] Int. Cl.⁵ ............................................. H05B 3/36
[52] U.S. Cl. ..................................... 219/213; 219/345; 219/549
[58] Field of Search ............... 219/213, 345, 528, 549, 219/529, 552, 553; 362/26, 32, 153

[56] References Cited

U.S. PATENT DOCUMENTS

| 2,665,561 | 1/1954 | Yocum | 362/32 |
|---|---|---|---|
| 2,745,942 | 5/1956 | Cohen | 219/528 |
| 2,816,201 | 12/1957 | Mulvey | 219/345 |
| 2,844,696 | 7/1958 | Custer | 219/549 |
| 3,119,918 | 1/1964 | Simon | 219/436 |
| 3,143,641 | 8/1964 | Wise | 219/549 |
| 3,418,448 | 12/1968 | Pradenas | 219/345 |
| 4,394,714 | 7/1983 | Rote | 362/32 |

FOREIGN PATENT DOCUMENTS

| 1138086 | 6/1957 | France | 219/345 |
|---|---|---|---|
| 289857 | 3/1953 | Switzerland | 219/528 |

OTHER PUBLICATIONS

Potter, W. G., "Heating the Building Entrance", Air Cond., Heating, and Ventilating, Oct. 1967, pp. 63-70, 219/213.

Primary Examiner—Teresa J. Walberg
Attorney, Agent, or Firm—Leon Gilden

[57] ABSTRACT

An apparatus utilizing a flexible web construction, including a series of electrical heating resistance elements directed therethrough. The mat includes a ribbed upper surface overlying a ribbed bottom surface. The upper surface includes sloping side walls positioned medially about a central ridge to direct fluid downwardly from an upper surface of the mat. Hollow chambers are optionally formed throughout the mat longitudinally thereof overlying the electric coils to cushion the coils and simultaneously produce heat chambers for maintaining a constant temperature throughout the web construction. Further, fiber optic cables may be included in side chambers longitudinally coextensive with side edges of the web to illuminate boundary portions of the web for individuals during limited light conditions.

5 Claims, 4 Drawing Sheets

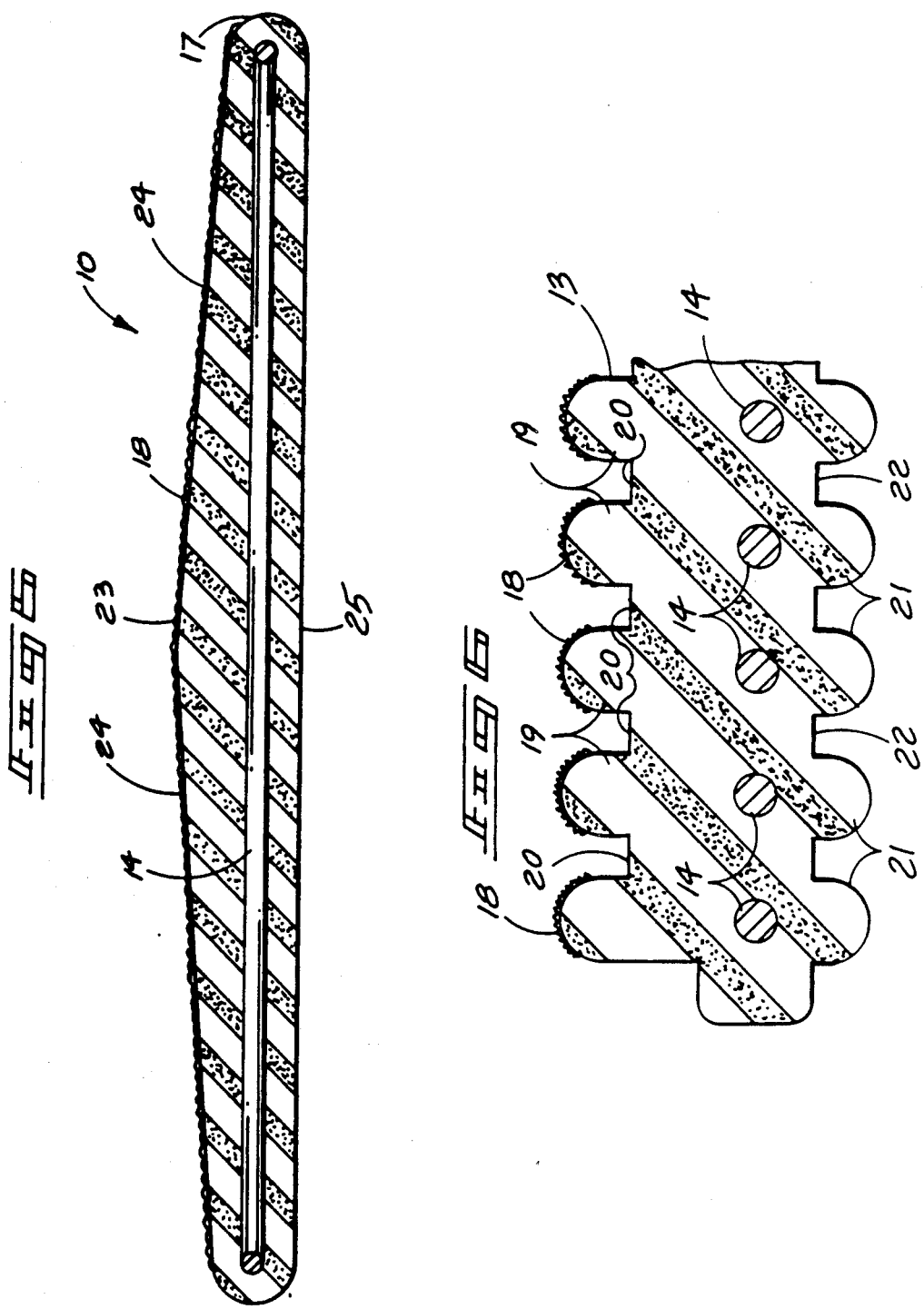

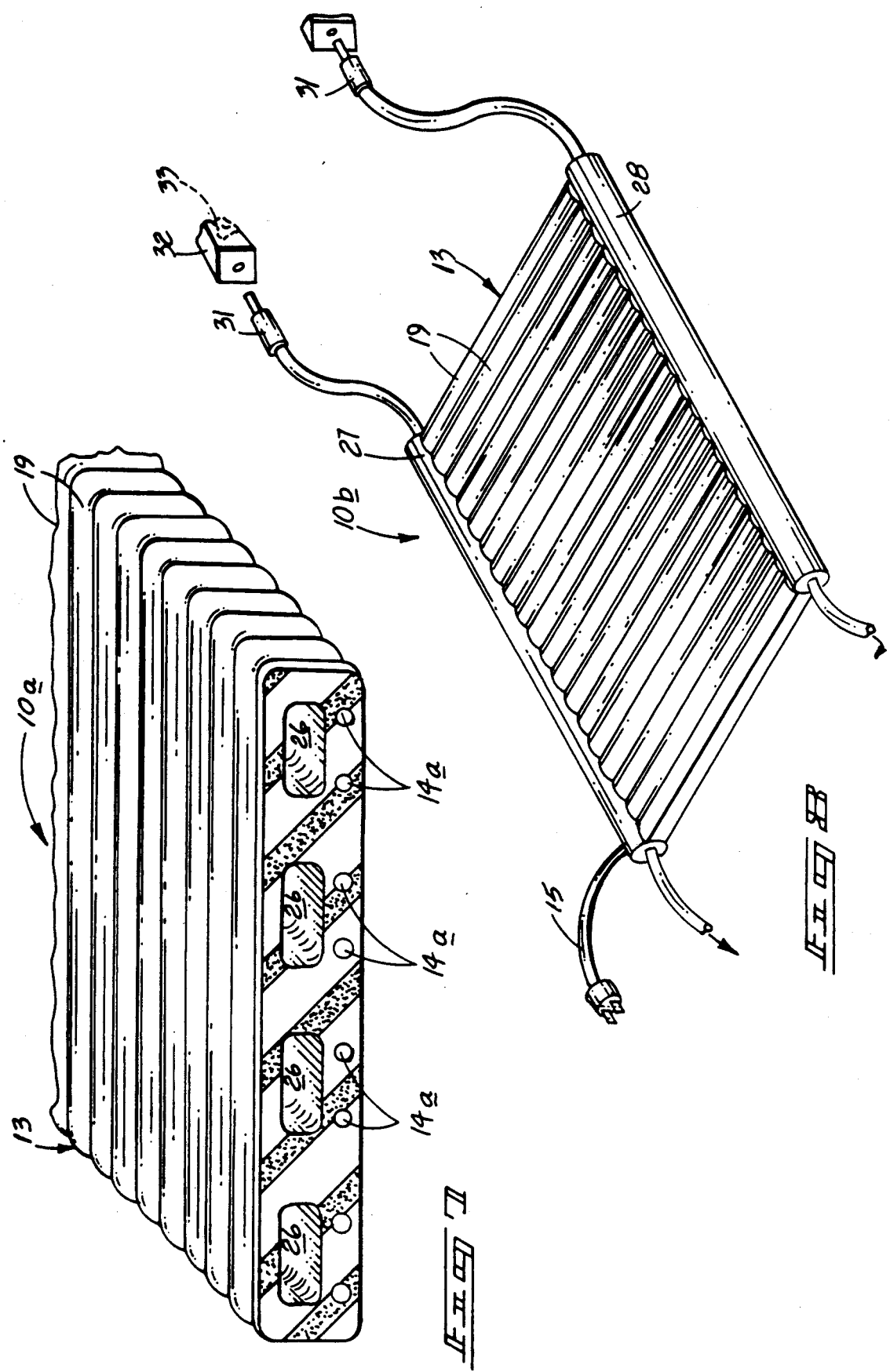

SNOW MELTING PATHWAY MAT APPARATUS

BACKGROUND OF THE INVENTION

1. Field of the Invention

The field of invention relates to mat construction, and more particularly pertains to a new and improved snow melting pathway mat apparatus wherein the same is positionable overlying selective walkways and the like to inhibit accumulation of snow on the pathways.

2. Description of the Prior Art

Snow melting electrical resistance mats are available in the prior art. Heretofore, the prior art organizations have failed to provide a complete snow melting organization to enhance effective longevity of the associated apparatus, as well as providing a convenient and efficient snow apparatus in use. Examples of the prior art include U.S. Pat. No. 3,806,702 to Spencer wherein a mat construction utilizes a serpentine resistance heating coil directed through the mat in cooperation with a temperature and precipitation sensor to actuate a power switch associated with the mat.

U.S. Pat. No. 4,564,745 to Deschenes sets forth a heating panel construction wherein spaced heating panels are imbedded within a fibrous reinforced concrete pathway.

U.S. Pat. No. 3,812,320 to Borgren provides a heated ground cover utilizing a plurality of sheets with heat directed from the cover effecting evaporation of moisture collected upon an uppermost surface of the sheet construction.

U.S. Pat. No. 3,766,644 to Davis sets forth an electric radiant heating device mounted on a surface sandwiched between two thin pliable mylar sheets for effecting heating within a room area overlying the heating device.

U.S. Pat. No. 4,646,818 to Ervin, Jr. wherein a snow melting organization includes a plurality of mats including a hose tubing flowing a heated mixture of water and antifreeze throughout.

As such, it may be appreciated that there continues to be a need for a new and improved snow melting pathway mat apparatus wherein the same addresses both the problems of ease of use, as well as effectiveness in construction in dissipating and preventing accumulation of snow upon an associated pathway.

SUMMARY OF THE INVENTION

In view of the foregoing disadvantages inherent in the known types of mat constructions now present in the prior art, the present invention provides a snow melting pathway mat apparatus wherein the same is positioned overlying a pathway to permit effective melting and discharge of snow accumulated upon an upper surface of the mat construction. As such, the general purpose of the present invention, which will be described subsequently in greater detail, is to provide a new and improved snow melting pathway mat apparatus which has all the advantages of the prior art mat constructions and none of the disadvantages.

To attain this, the present invention provides a flexible web construction, including a series of electrical heating resistance elements directed therethrough. The mat includes a ribbed upper surface overlying a ribbed bottom surface. The upper surface includes sloping side walls positioned medially about a central ridge to direct fluid downwardly from an upper surface of the mat. Hollow chambers are optionally formed throughout the mat longitudinally thereof overlying the electric coils to cushion the coils and simultaneously produce heat chambers for maintaining a constant temperature throughout the web construction. Further, fiber optic cables may be included in side chambers longitudinally coextensive with side edges of the web to illuminate boundary portions of the web for individuals during limited light conditions.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved snow melting pathway mat apparatus which has all the advantages of the prior art mat constructions and none of the disadvantages.

It is another object of the present invention to provide a new and improved snow melting pathway mat apparatus which may be easily and efficiently manufactured and marketed.

It is a further object of the present invention to provide a new and improved snow melting pathway mat apparatus which is of a durable and reliable construction.

An even further object of the present invention is to provide a new and improved snow melting pathway mat apparatus which is susceptible of a low cost of manufacture with regard to both materials and labor, and which accordingly is then susceptible of low prices of sale to the consuming public, thereby making such snow melting pathway mat apparatus economically available to the buying public.

Still yet another object of the present invention is to provide a new and improved snow melting pathway mat apparatus which provides in the apparatuses and methods of the prior art some of the advantages thereof, while simultaneously overcoming some of the disadvantages normally associated therewith.

Still another object of the present invention is to provide a new and improved snow melting pathway mat apparatus wherein the same is positioned overlying various and selective pathways to permit melting of snow accumulated thereon and effectively discharge the fluid from an upper surface of the mat construction.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic cross-sectional view, taken along the lines 5—5 of FIG. 4 in the direction indicated by the arrows.

FIG. 6 is an orthographic cross-sectional view, taken along the lines 6—6 of FIG. 4 in the direction indicated by the arrows.

FIG. 7 is an orthographic cross-sectional view of a modified mat construction of the instant invention.

FIG. 8 is an isometric illustration of a further modified component utilized by the mat construction of the instant invention.

DESCRIPTION OF THE PREFERRED EMBODIMENT

Figure 1:
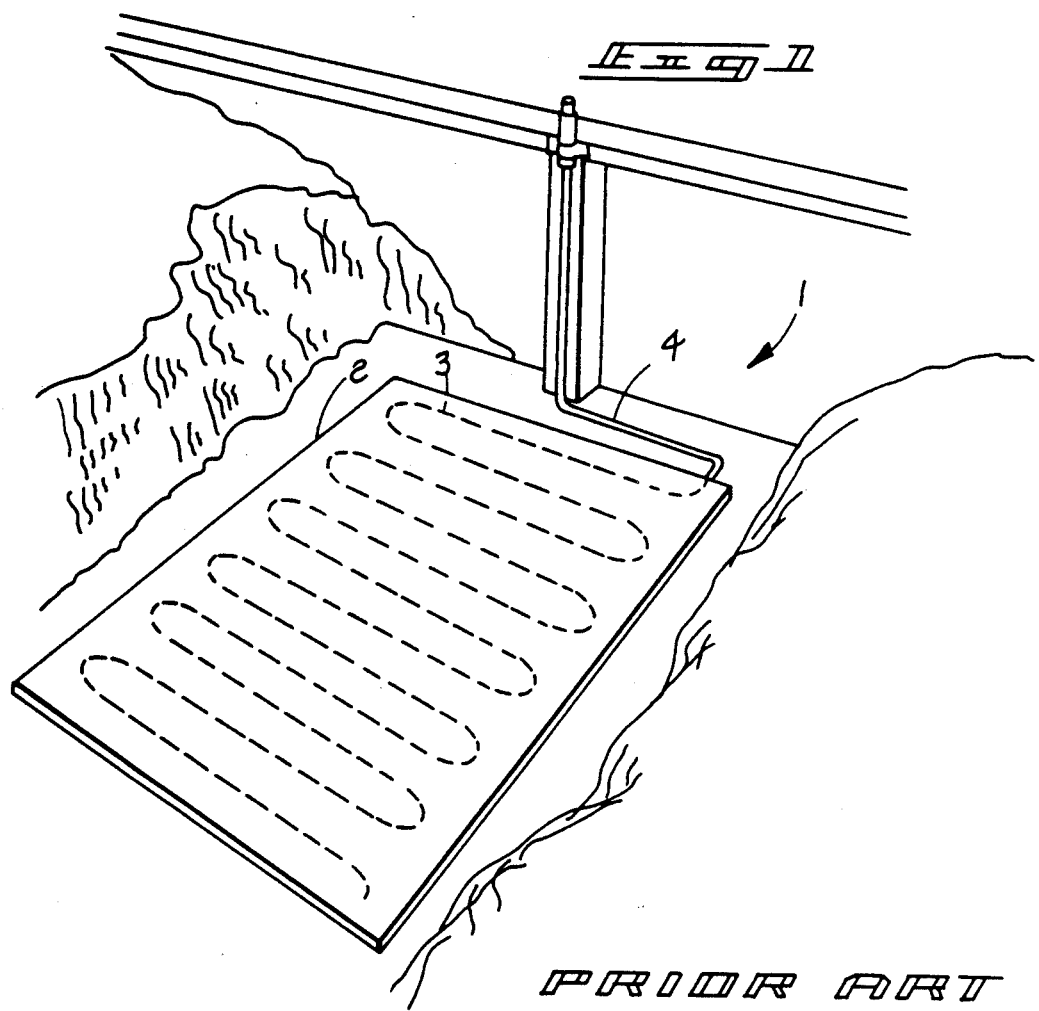
FIG. 1 is an isometric illustration of a prior art snow melting mat apparatus.

With reference now to the drawings, and in particular to FIGS. 1 to 8 thereof, a new and improved snow melting pathway mat apparatus embodying the principles and concepts of the present invention and generally designated by the reference numerals 10, 10a, and 10b will be described.

Figure 2:
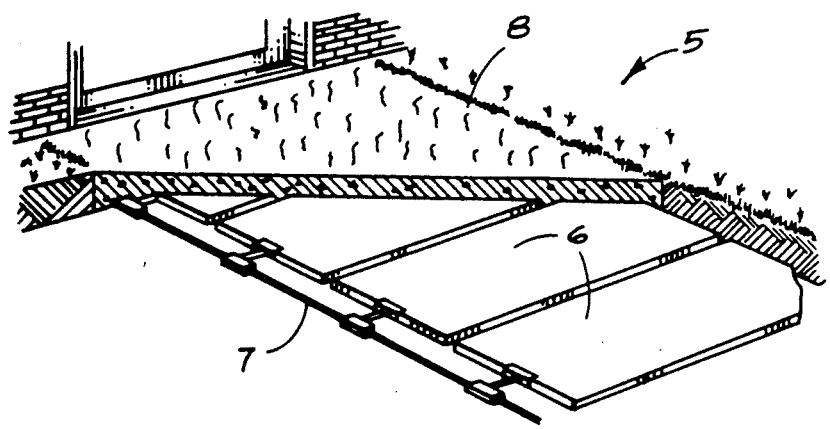
FIG. 2 is an isometric illustration of a further snow melting mat construction imbedded within a concrete matrix.

FIG. 1 illustrates a prior art mat apparatus 1 wherein a mat 2, including a serpentine heating element 3 and an associated electrical transmission line 4, is positioned upon an associated support surface or pathway. This device, as described in U.S. Pat. No. 3,806,702, utilizes temperature and precipitation sensors to effect actuation of the organization. FIG. 2 illustrates a further prior art mat apparatus 5 wherein spaced heating pads 6, including a common electrical transmission line 7, are imbedded within a concrete matrix 8 utilizing a fibrous additive therewithin.

Figure 3:
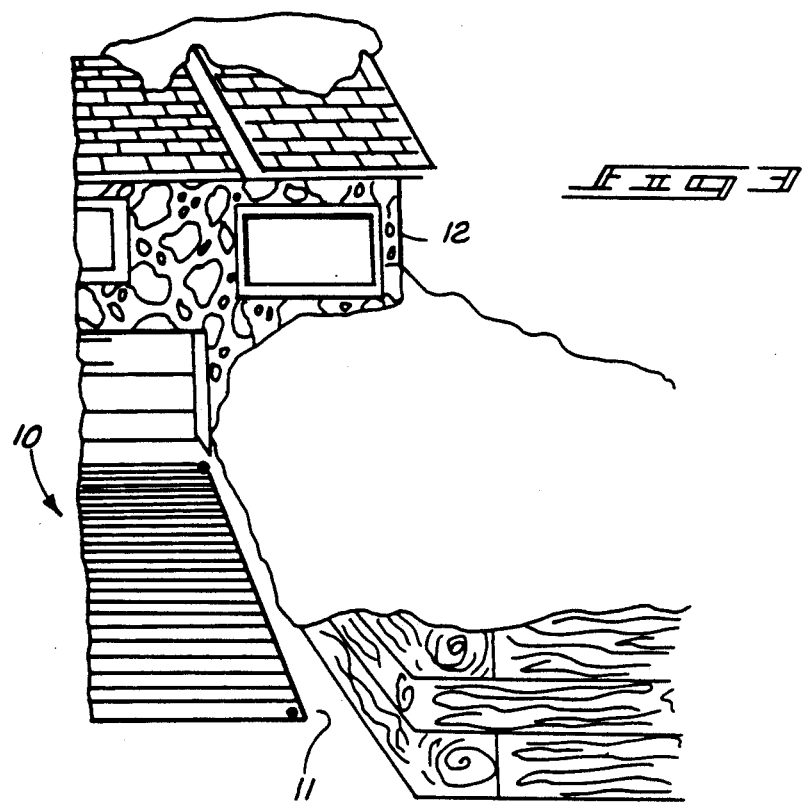
FIG. 3 is an isometric illustration of the instant invention in position upon an associated pathway.
Figure 4:
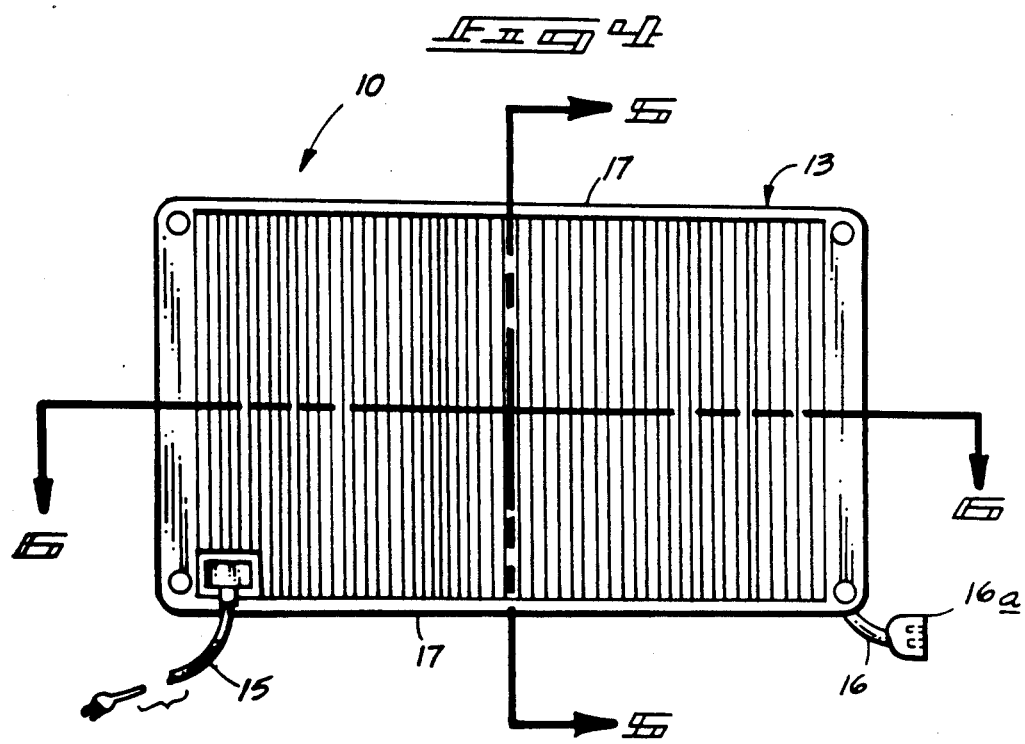
FIG. 4 is a top orthographic view of the instant invention.

More specifically, the snow melting pathway mat apparatus 10 of the instant invention, as illustrated in FIG. 3, mounted overlying a selective pathway 11 positioned forwardly of a dwelling 12. The mat includes a resilient polymeric web 13, including a series of spaced electrical resistance heating elements 14 in electrical communication with one another, defining a matrix of such elements throughout the web. A first electrical connector line 15 includes an electrical plug 15a directed outwardly adjacent a rearward end portion of the web, wherein a second electrical connector line 16 includes an electrical socket 16a cooperative with a further plug 15a to permit series securement of a plurality of the webs 13 to accommodate various lengths and widths of pathways.

Reference to FIG. 5 illustrates a cross-sectional illustration of the web 13, including arcuate side surfaces 17 to enhance conduction of fluid melted upon an upper surface of the web outwardly therefrom, and further defined by roughened, textured contact surface 18 upon an upper surface of the web. The web 13, as illustrated in FIG. 5, is defined by generally planar bottom surface 25 to enhance contact with an underlying pathway, including sloped side portions 24 directed downwardly from a raised, longitudinal central ridge 23 coextensively formed with the length of the web 13 to direct fluid downwardly through each side of the web and display such fluid laterally and downwardly about the arcuate side edges 17. FIG. 6 illustrates the upper surface of the web 13, wherein each of the sloping side portions 24 includes top surface parallel ribs 19 directed orthogonally relative to a longitudinal axis of the web 13 to direct and displace fluid melted upon an upper surface of the web downwardly therefrom. The ribs 19 include top surface channels 20 to provide fluid conduction from the top surface through the channels. It should be noted that the upper surface of each of the ribs 19 includes the roughened textured contact surface 18. The bottom surface 25 of the web 13 includes bottom surface parallel ribs 21, with bottom surface channels 22 formed therebetween to permit water drainage from interiorly of the bottom ribs 21 limiting accumulation of fluid underlying the bottom surface of the web.

The electrical heating elements 14 are spaced within the web, as illustrated in FIGS. 5 and 6 for example.

FIG. 7 illustrates the web 13 in a modified application of the instant invention, wherein the web 13 incorporates hollow air chambers 26 directed longitudinally of the web, wherein the web 13 includes further heating elements 14a directed longitudinally as well as transversely of the web to define a crossed matrix of such transmission lines to enhance heating of the web 13. It should be noted that a plurality of such further heating elements 14a underlie each of the hollow air chambers 26. In this manner, the hollow air chambers 26 enhance retention of heat within the web 13, as well as cushioning the underlying electrical lines 15 and 15a. The chambers 26 are preferably formed as generally elongate, parallelepiped chambers.

FIG. 8 illustrates the web 13 incorporating a further modified aspect of the invention 10b, wherein first and second side edge transparent chambers 27 and 28 are coextensively and longitudinally integrally mounted to the longitudinal sides of the web 13. Each of the transparent chambers 27 and 28 includes a respective first and second flexible fiber optic cable 29 and 30 directed therethrough. The fiber optic cables permit illumination of the side boundaries of the web 13 during periods of limited lighting conditions for visual observation by individuals to permit such individuals understanding of the positioning of the webs 13 upon a pathway 11. Each of the fiber optic cables includes a remote connection end 31 for reception within an associated illumination source 32, including an illumination bulb 33 therewithin to direct illumination through the fiber optic cables.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A snow melting pathway mat apparatus defined as a flexible web,
    including a forward end, a rear end, and spaced longitudinal side ends,
    the web including spaced parallel heating elements directed through the web,
    each of the heating elements in electrical communication with one another, including a first electrical connector line directed outwardly of the web adjacent a rear end thereof,
    and further including a second electrical connector line directed outwardly of the web adjacent the forward end thereof, including electrical socket associated with the electrical connector line, and
    wherein the web includes a generally planar bottom surface, the bottom surface including a series of parallel ribs directed orthogonally relative to the side edges of the web, including bottom surface channels between the ribs to conduct fluid flow therethrough, the web further including a central ridge directed longitudinally and medially of a top surface of the web and coextensive with the top surface of the web, the top surface further including spaced parallel top surface ribs directed throughout the top surface of the web arranged generally orthogonally relative to the central ridge, each of the top surface ribs including a roughened top portion to enhance traction thereon, and
    wherein the web further includes spaced parallel longitudinal chambers coextensive with and longitudinally arranged relative to the web, each of the chambers includes a plurality of spaced, parallel further electrical heating elements arranged orthogonally relative to the heating elements, the further heating elements and the heating elements in electrical communication with one another, the chambers defined by generally elongate parallelepiped configuration.

2. An apparatus as set forth in claim 1 wherein each of the side edges of the web is of an arcuate configuration to enhance directing of moisture from the top surface of the web.

3. An apparatus as set forth in claim 2 wherein the web further includes illumination means mounted coextensively with and parallel to one another and integrally and fixedly secured to the side edges of the web for enhanced illumination of the side edges of the web during limited light conditions.

4. An apparatus as set forth in claim 3 wherein the illumination means each includes an elongate, transparent chamber, each transparent chamber defined by a generally cylindrical configuration and each transparent chamber including a flexible fiber optic cable directed therethrough.

5. An apparatus as set forth in claim 4 wherein each fiber optic cable includes a connector end, and further including an illumination source, each connector end receivable within the illumination source, and each illumination source including an illumination bulb therewithin to direct illumination through each of the fiber optic cables.

* * * * *